United States Patent
Fingler et al.

[11] Patent Number: 5,892,870
[45] Date of Patent: Apr. 6, 1999

[54] FIBRE OPTIC CABLE CONNECTOR

[75] Inventors: Laurence H. Fingler, King Township; L. Scott Fingler; Geoffrey P. Laycock, both of Aurora, all of Canada

[73] Assignee: Fiber Connections Inc., King City, Canada

[21] Appl. No.: 558,652

[22] Filed: Nov. 16, 1995

[51] Int. Cl.⁶ .............................. G02B 6/38; G02B 6/00
[52] U.S. Cl. .............................. 385/59; 385/60; 385/78; 385/80; 385/134; 385/135
[58] Field of Search .................. 385/59, 60, 71, 385/72, 78, 80, 134–138, 75, 139; 174/52.1, 52.2, 59, 60; 439/931, 936

[56] References Cited

U.S. PATENT DOCUMENTS

| | | | |
|---|---|---|---|
| 4,737,009 | 4/1988 | Kakii et al. | 385/60 |
| 4,824,196 | 4/1989 | Bylander | 385/134 |
| 4,976,508 | 12/1990 | Okura et al. | 385/110 |
| 4,976,510 | 12/1990 | Davila et al. | 385/135 |
| 5,052,775 | 10/1991 | Bossard et al. | 385/135 |
| 5,159,654 | 10/1992 | Salter | 385/59 |
| 5,169,568 | 12/1992 | Ainger, III | 264/1.5 |
| 5,218,657 | 6/1993 | Tokudome et al. | 385/70 |
| 5,231,687 | 7/1993 | Handley | 385/139 |
| 5,235,665 | 8/1993 | Marchesi et al. | 385/135 |
| 5,283,851 | 2/1994 | Vergnolle | 385/134 |
| 5,434,941 | 7/1995 | Bechtel et al. | 385/68 |
| 5,444,804 | 8/1995 | Yui et al. | 385/49 |
| 5,446,822 | 8/1995 | Keith | 385/135 |
| B1 4,976,510 | 9/1994 | Davila et al. | 385/135 |

FOREIGN PATENT DOCUMENTS 2570196  3/1986  France ................. 385/135

*Primary Examiner*—Hemang Sanghavi
*Attorney, Agent, or Firm*—Connolly & Hutz

[57] ABSTRACT

A connector for fibre optic cable includes a housing having a plurality of female connectors therein. A multi-fibre optic cable has an end extending into the housing. Each of the fibres of the multi-fibre optic cable terminate at a respective one of the female connectors. Adhesive encases the fibres of the multi-fibre optic cable within the housing to inhibit movement thereof. A method of forming a multi-connection connector for a multi-fibre optic cable and an adapter for optically coupling a pair of optic fibres are also disclosed.

16 Claims, 4 Drawing Sheets

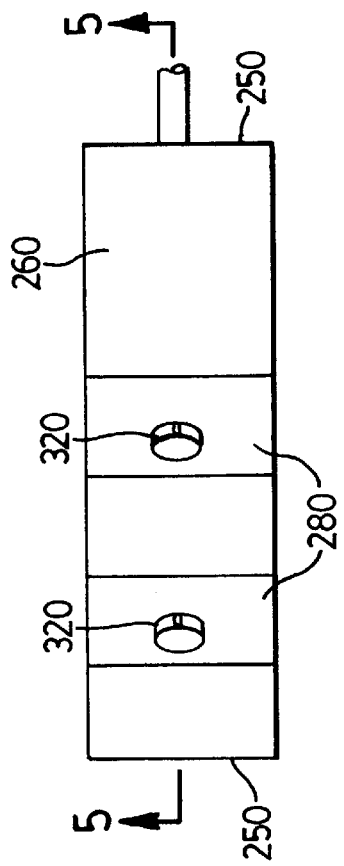
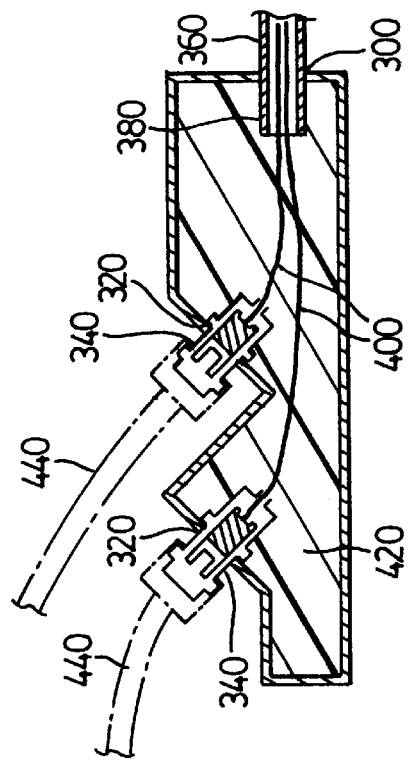
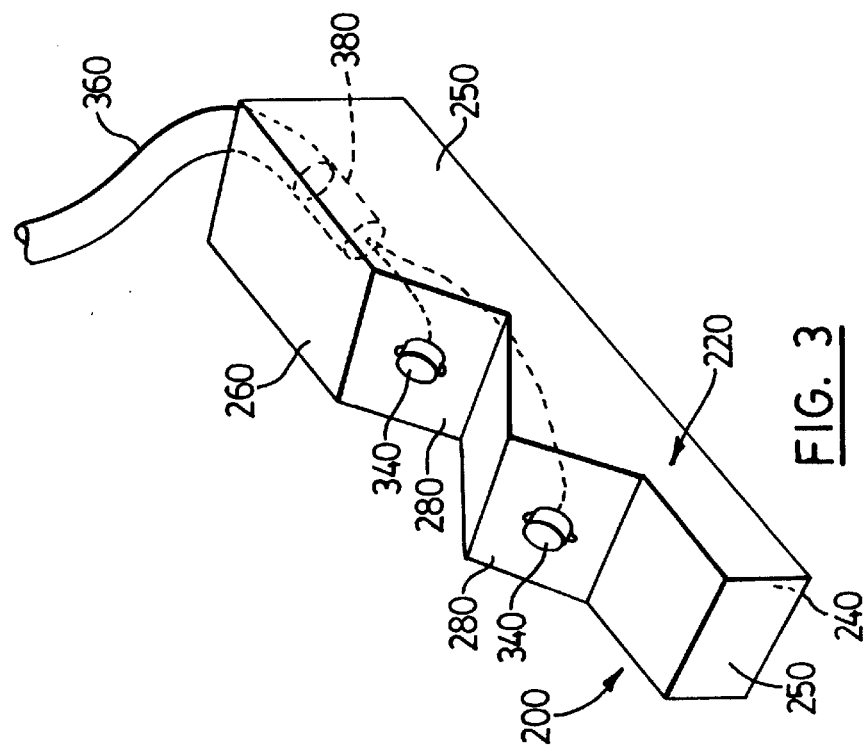

FIBRE OPTIC CABLE CONNECTOR

FIELD OF THE INVENTION

The present invention relates in general to fibre optic cable connectors and patch panels and more particularly to a connector for connecting fibre optic patch cables to a multi-fibre optic cable and to an adapter for optically coupling a pair of optic fibres.

BACKGROUND OF THE INVENTION

Fibre optic cable is used to communicate digital and analogue information by the transmission of pulses of light. By necessity, the fibre optic cable must have joints or connections with other fibre optic cable. Signal strength can be weakened by losses at joint or connections due to reflection or absorption of light at the joint between the fibre optic cables. It is desirable to minimize these losses either by minimizing the number of joints in the fibre optic transmission line or by ensuring that any joints or connections are of the highest optical quality.

Normally, two pieces of equipment are interconnected by connecting one end of a short section of fibre optic cable (called a patch cord) to the jack provided on the external surface of one of the pieces of equipment, and by connecting the other end of the patch cord to a patch panel. The patch panel has a housing upon which are secured a plurality of jacks, each of which is optically connected to one end of an individual fibre optic cable which forms part of am multi-fibre optic cable. The multi-fibre optic cable exits from the patch panel and runs to the other piece of equipment or to another patch panel which in turn is connected to the other piece of equipment.

Traditionally, one fibre optic cable is connected to the other fibre optic cable either by physical contact (butt-joining) or by melting them together (fusion).

Butt-joints are made by grinding the end surfaces of the two fibre optic cables to a smooth, convex radius and securing the mating cables so that their respective end surfaces are provided with secure physical contact. Failure to do this may result in the optical connection between the fibre optic cables being broken. Butt-joining is used to attach patch cords to patch panels.

Two fibre optic cables can also be joined by heating their end portions to a plastic or melted state, holding them together in alignment and permitting the fibres to solidify together. This process is usually referred to as fusion or as fusing the fibre optic cables together.

The conventional method for connecting a multi-fibre optic cable to a patch panel is to insert the end of the multi-fibre optic cable into the housing of the patch panel and divide the multi-fibre optic cable into its individual fibres. The fibres are wrapped around a spool within the patch panel housing to allow for additional fibre for making connections in case the end of the fibre is damaged in an initial attempt and to prevent bending of the cable to the extent that the optical fibre breaks. Spools of such type are illustrated in U.S. Pat. No. 4,976,510 issued Dec. 11, 1990 and U.S. Pat. No. 5,231,587 issued Jul. 27, 1993.

Each individual fibre is then optically connected to an external connector attached to the housing of the patch panel either by:

(a) fusing the end of the individual fibre optic cable to a pigtail which in turn is butt-joined to the external connector; or (b) grinding the end of the individual fibre, attaching a field connector to the fibre and attaching the field connector to a coupler attached to the housing of the patch panel.

As will be appreciated, each process (the butt-joining and the fusion process) requires specific equipment to be used to machine the ends of the fibre optic cable or to soften or melt the ends of the fibre-optic cable while at the same time establishing the proper relative alignment of the fibre optic cables. The equipment is relatively easy to use in a factory environment where energy the plentiful and environmental conditions are easily controlled. In a field environment however, the grinding, heating and aligning steps are more difficult to do well and consume time and energy in the installation process.

Thus there is a need for a patch panel device which is easily used in the field to provide a reliable connection between a patch cord extending from one piece of equipment and a fibre optic cable extending to another piece of equipment or to another patch panel. There is also a need for a connector which will securely retain a fibre optic cable so as to prevent movement of it within a housing to inhibit damage to the fibre optic cable.

It is therefore an object of the present invention to provide a novel connector for fibre optic cable, a novel method of forming the same and a novel adapter for optically coupling a pair of optic fibres.

SUMMARY OF THE INVENTION

According to one aspect of one embodiment of the present invention, a connector is provided for fibre optic cable comprising a housing having a plurality of female connectors therein and a multi-fibre optic cable having an end extending into the housing. Each of the fibres of the multi-fibre optic cable extending into the housing terminates at a respective one of the female connectors. An adhesive encases the fibres of the multi-fibre optic cable within the housing to inhibit movement of the fibres within the housing.

According to another aspect of one embodiment of the present invention, there is provided a method of forming a connector for a multi-fibre optic cable, the connector having a housing carrying a plurality of female connectors. The method comprises the steps of: extending a multi-fibre optic cable into the housing and polishing and terminating each end of the fibres of the fibre optic cable at a respective one of the female connectors; and bonding the fibres of the cable within the housing to inhibit movement thereof.

According to another aspect of the present invention there is provided an adapter for optically coupling a pair of optic fibres, one of which is carried by a fibre optic cable having a male coupler at one end at which said one optic fibre terminates. The one end of the male coupler carries a first ferrule. The adapter includes a body having a female coupler thereon adapter to mate with the male coupler and accommodate the first ferrule. The body also has a passage formed therein to receive the other of said optic fibres. The adapter has a second ferrule within the body at which the other optic fibre terminates. The second ferrule is positioned within the body so that the first and second ferrules position the one and other optic fibres so that they are optically coupled when said male and female couplers are in mating engagement. The body also has means to secure said second ferrule within the body.

BRIEF DESCRIPTION OF THE DRAWINGS

A detailed description of a preferred embodiment of the present invention is provided herein below with reference to the following drawings, in which like numbers refer to like elements and in which:

FIG. 3 is a perspective view of a connector for fibre optic cable in accordance with the present invention;

FIG. 4 is a top plan view of the connector of FIG. 3;

FIG. 5 is a side cross-sectional view of the connector taken along lines 5–5' of FIG. 4;

DETAILED DESCRIPTION OF THE PREFERRED EMBODIMENT

Figure 1:
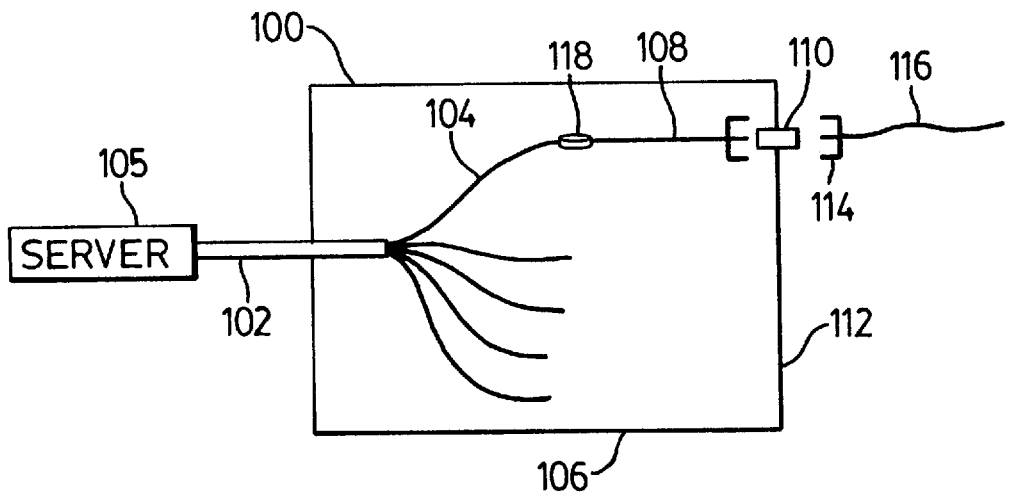
FIG. 1 is a schematic view of a prior art patch panel illustrating the use of pigtails within the patch panel fused to the individual fibres of the multi-fibre optic cable.
Figure 2:
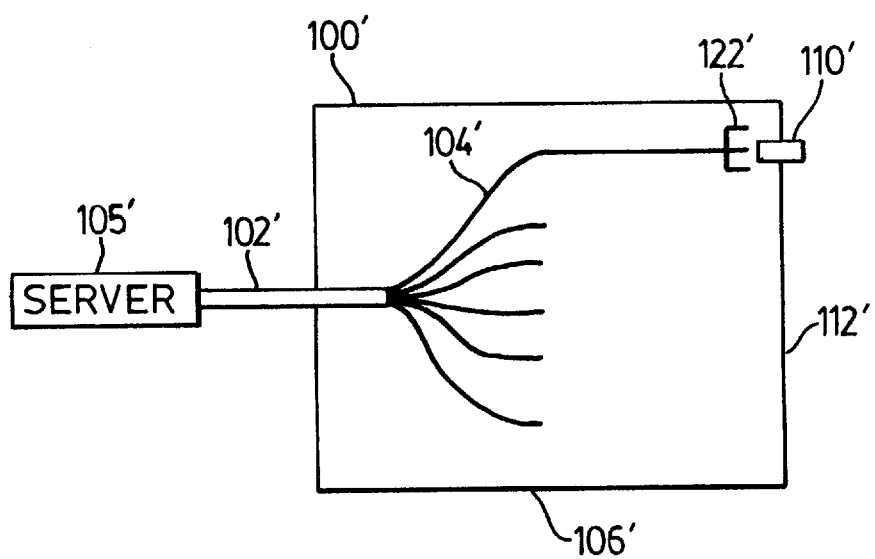
FIG. 2 is a schematic view of a prior art patch panel illustrating the use of a field installed connector.

Turning firstly to FIG. 1 and 2, a pair of prior art patch panels are illustrated. In the prior art patch panel 100 shown schematically in FIG. 1, multi-fibre optic cable 102 consisting of twelve individual fibre optic cables 104 extends from a piece of equipment such as a server 105 and enters a patch panel housing 106. The fibres of the fibre optic cable 104 are separated and are spliced by, for example, fusion, to a "pigtail" 108 which in turn is connected to a female—female coupler 110 passing through a face 112 of the patch panel housing 106. The outside female end of coupler 110 may be attached to a male connector 114 on a patch cord 116 extending another piece of equipment.

The disadvantage of the prior art patch panel of FIG. 1 is that a splice 118 has to be made in the field using special equipment. If the fibres are not fused properly, signal degradation can occur.

A second prior art patch panel 100' is illustrated in FIG. 2. Similar to the above described patch panel 100, a multi-fibre optic cable 102' extends from a server 105' and enters a patch panel housing 106'. The multi-fibre optic cable 102' is then separated in the patch panel housing 106' into individual fiber optic cables 104. In this patch panel, male connectors 122' are attached to the individual fibre optic cables 104 at the installation location. Hence, the end of the individual fibre optic cables 104' must be ground to the required convex surface in the field, which is sometimes difficult to achieve with the same precision as can be obtained in the factory. The male connectors 122' are then attached to respective female—female couplers 110' affixed to the patch housing 106'. This field connection is labour and equipment intensive, the vulnerable to poor installation conditions.

FIGS. 3 to 8 illustrate an embodiment of a fibre optic cable connector 200 for fibre optic cable in accordance with the present invention. It should be appreciated that the embodiment of the invention illustrated in FIGS. 3 to 8 is preferably assembled entirely at a factory, in controlled environmental conditions and then transported to the field for connection to a server and by patch cords, to other equipment. In this way, the connector 200 replaces the traditional patch panel and eliminates the need for making connections in the field, other than by way of patch cords.

As shown in FIGS. 3 to 8, fibre optic cable connector 200 is provided with a housing 220 which can be separated into a pair of halves to expose the interior of the housing. The housing has a base 240, upstanding sides 250 and an upper surface 260. As shown more particularly in FIG. 4, upper surface 260 of the housing 220 is provided with sloped surfaces 280. Each sloped surface 280 has a coupler opening 320 therein.

The housing 220 is also provided with a cable opening 300 formed in one of the sides 250. Multi-fibre optic cable 360 has an end 380 extending into housing 220 by way of opening 300. Within the housing, each individual fibre optic cable 400 of the multi-fibre optic cable 360 terminates at an adapter 340 secured within a coupler opening 320. Although only two coupler openings 320 are shown in the embodiment illustrated in FIGS. 3 to 7, it should be appreciated that as many coupler openings as are needed to accommodate the number of individual fibre optic cables 400 within the multi-fibre optic cable 360 can be provided in the sloped surfaces 280.

Figure 7:
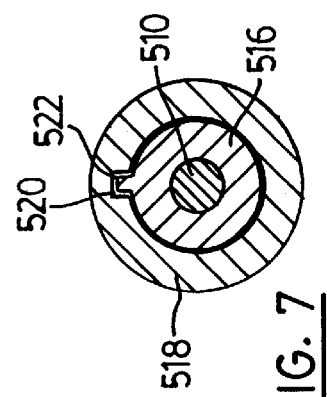
FIG. 7 is a cross-sectional view of the adapter of FIG. 6 taken along lines 7–7' of FIG. 6.
Figure 6:
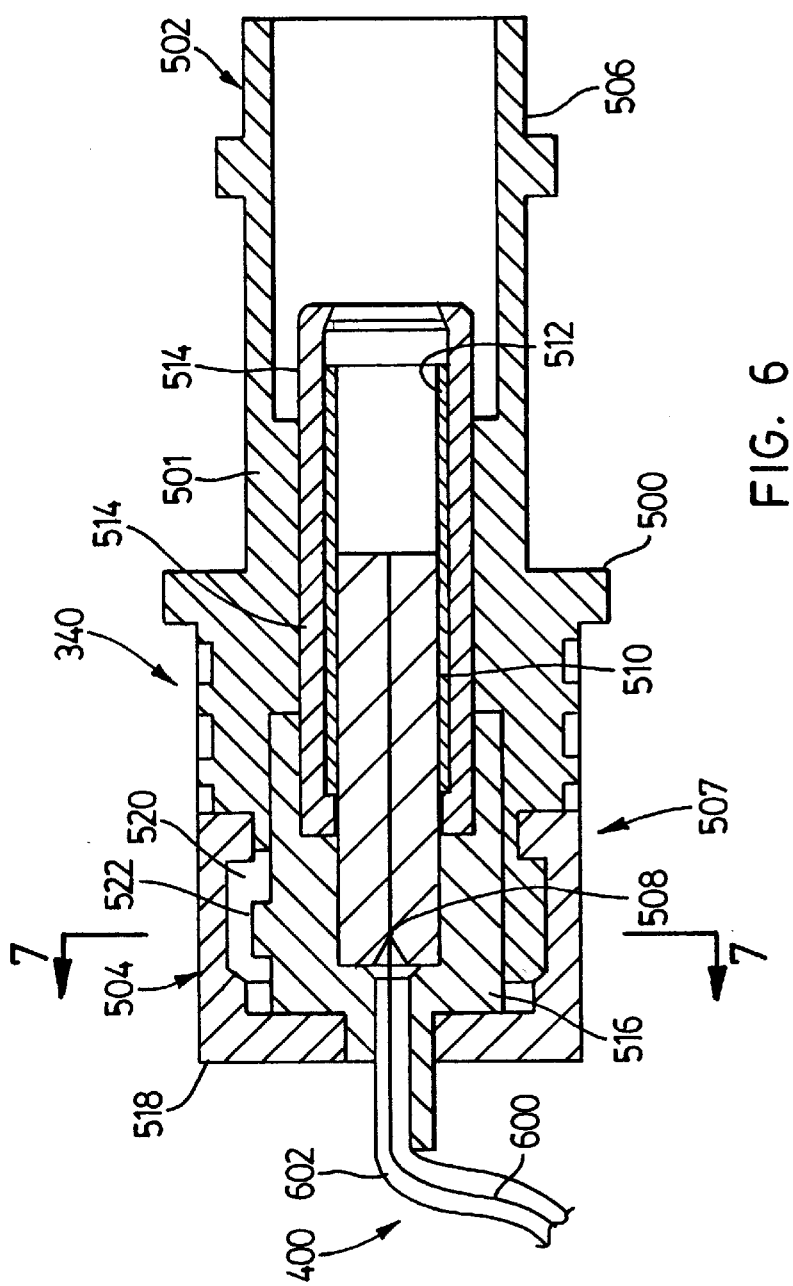
FIG. 6 is a cross-sectional detailed view of an adapter for optically coupling a pair of optic fibres in accordance with the present invention.

With reference to FIGS. 6 and 7, one of the adapters 340 is better illustrated. As can be seen, adapter 340 includes an adapter body 500 having a pair of ends 502 and 504 respectively. End 502 is provided with a traditional female patch cable receiving coupler 506. The other end 504 is provided with an assembly 507 for receiving and securing an individual optic fibre of one of the fibre optic cables 400.

The assembly 507 includes a ferrule 510 positioned within the adapter body 500 and having a centrally located, longitudinal bore 508 formed therein. The ferrule 510 is held in place within a bore 501 formed in adapter body 500 by a sleeve 512 and an adapter bushing 514. The sleeve is preferably made of a zirconium alloy. The adapter bushing 514 and the ferrule 510 are restricted from longitudinal motion by a stem 516 and a cap nut 518. Cap nut 518 is secured to the adapter body 500 by threaded engagement.

The adapter body 500 is provided with a longitudinal channel 520 adapted to receive a lug 522 on the stem 516. The location of lug 522 in channel 520 prevents ferrule 510 from rotating within adapter body 500 after the cap nut 518 is threadably secured to the adapter body 500.

To assemble the adapter 340 with the fibre optic cable 400, the cap nut 518, lug 522 and stem 516 are slid onto a length of fibre optic cable 400. The insulating layer 602 (commonly referred to as buffer) of the fibre optic cable 400 is removed from approximately one (1) centimeter of the end of the fibre optic cable to expose the optic fibre 600. Using a hypodermic syringe, curable adhesive such as epoxy is introduced into the bore 508 of the ferrule 510. The end of the exposed optic fibre 600 is passed into the bore 508, so as to protrude from the opposite end of the ferrule 510. The end of the optic fibre is ground to the desired convex shape. The fibre optic cable is then checked for optical continuity and acceptable quality. If the quality is acceptable, the adhesive is allowed to cure. If the quality is not acceptable, the fibre optic cable 400 is removed and the fibre optic cable 400 is replaced or re-stripped and the installation process is repeated. Adapter bushing 514 and sleeve 512 are inserted into the bore 501 of adapter body 500. Once the adhesive has cured, the ferrule 510 and the stem 516 are inserted into sleeve 512. Cap nut 518 is threaded onto the adapter body 500 to hold the ferrule 510 in place.

As one of skill in the art will appreciate, the above steps are performed for each adapter 340 on the connector 200. Once the fibre optic cables 400 have been attached to the adapters, the fibre optic cable 360 and the individual fibres 380 are encased in housing 220 by an adhesive 420 such as epoxy filling the housing. Movement of the fibre optic cable 380 and 400 within the housing 220 is inhibited, thus making the connector 200 mechanically rugged.

As mentioned previously, the connector 200 is preferably assembled at a factory. The connector 200 can then be transported to the installation location where the multi-fibre optic cable 360 can be connected to a piece of equipment such as a server. Other pieces of equipment can then be optically coupled to the multi-fibre optic cable 360 through the connector 200 by was of patch cords extending between the other pieces of equipment and the adapters 340.

Figure 8:
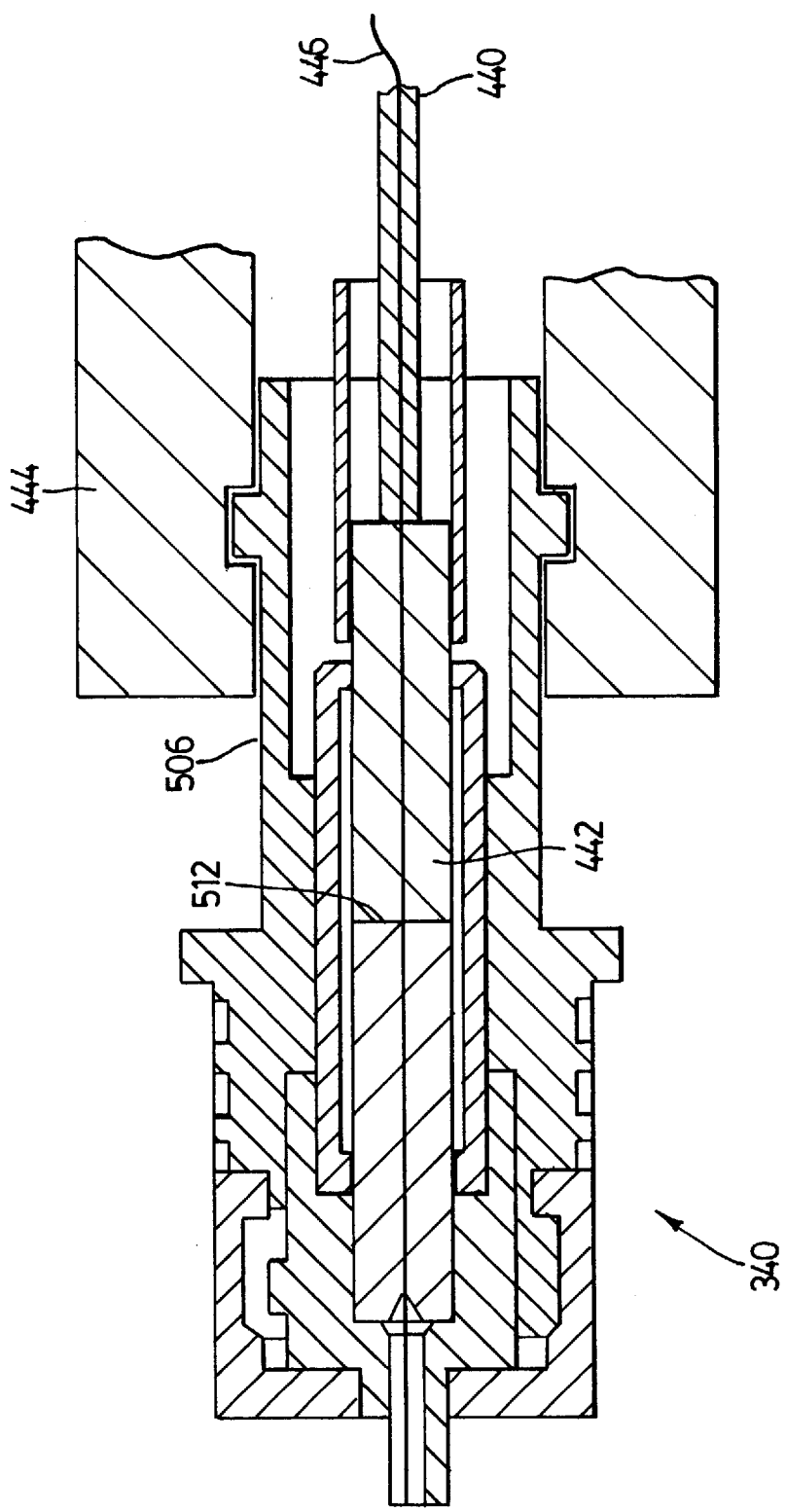
FIG. 8 is a cross-sectional view of the adapter of FIG. 6 connected to a standard patch cable.

With reference to FIG. 8, a standard patch cable 440 extending from a piece of equipment is shown connected to the female coupler 506 of an adapter 340 to convey a signal from the connector 200 to another device. The patch cable 440 is provided with ferrule 442 which is received in sleeve 512 of the adapter. Locking nut 444 engages the female coupler 506 so as to bias the optic fibre 446 with ferrule 442 into optical continuity with the optic fibre 600 terminating in ferrule 510 of the adapter.

With reference to FIG. 5, when the base 240 of the housing 220 rests on the ground, sloped surfaces 280 permit the patch cables 440, shown in phantom lines, to be attached to the connector 200 so that the cables may resting a generally horizontal position so as to reduce stress on patch cables 440 and to permit many cables to be attached to the connector 200 and lie generally on top of one another in a horizontal arrangement.

Other variations and modifications of the invention are possible. For example, although the embodiment of the invention described shows only two adapters, the device could be made with as many adapters as needed or desired with the adapters arranged in a line so shown in the preferred embodiment or in an array, consisting of parallel rows of couplers. All such modifications or variations are believed to be within the sphere and scope of the invention as defined by the claims appended hereto.

We claim:

1. A connector for a multi-fibre optic cable comprising:
    a housing;
    a plurality of female connectors accommodated by said housing, each of said female connectors having a first end extending into said housing to receive an optic fibre and a second end exterior of said housing to receive a patch cable;
    a multi-fibre optic cable having an end extending into said housing, each of the optic fibres of the multi-fibre optic cable terminating at said first end of a respective one of said female connectors; and
    an adhesive filling said housing and encasing said optic fibres of said multi-fibre optic cable to inhibit movement of said optic fibres within said housing.

2. A connector according to claim 1 wherein said housing has an upper surface, said female connectors being accommodated by openings in said upper surface.

3. A connector according to claim 2 wherein said upper surface includes at least one sloped portion, said openings being provided in said at least one sloped portion.

4. A connector according to claim 3 wherein said upper surface includes a plurality of longitudinally spaced, parallel sloped portions, each of said sloped portions having at least one opening therein to receive a female connector.

5. A connector according to claim 1 wherein each of said female connectors is in the form of an adapter for optically coupling an optic fibre of said multi-fibre optic cable with an optic fibre in said patch cable, said patch cable having a male coupler at one end thereof which accommodates a first ferrule surrounding the optic fibre therein, said adapter including: a body having a female coupler thereon adapted to mate with said male coupler and accommodate said male coupler, said body having a passage formed therein to receive an optic fibre of said multi-fibre optic cable; a second ferrule within said body at which the optic fibre of said multi-fibre optic cable terminates, said second ferrule being positioned within said body so that said first and second ferrules optically couple said optic fibres when the male and female couplers are in mating engagement; and means to secure the second ferrule within said body.

6. A method of forming a multi-connection connector for a multi-fibre optic cable, said connector having a housing carrying a plurality of female connectors, said method comprising the steps of:
    extending a multi-fibre optic cable into said housing and terminating each of the optic fibres of said multi-fibre optic cable at a respective one of said female connectors; and
    filling said housing with a bonding agent to inhibit movement of said optic fibres within said housing.

7. The method of claim 6 wherein said bonding agent is in the form of an adhesive.

8. A connector for a multi-fibre optic cable comprising:
    a housing having a base, generally upright sides about the periphery of said base and an upper surface bridging said sides above said base, said upper surface being generally saw-toothed in configuration and presenting a plurality of inclined, longitudinally spaced faces;
    a plurality of connectors accommodated by openings in the inclined faces of said upper surface, each of said connectors having a first end extending into said housing to receive an optic fibre and a second end exterior of said housing to receive a patch cable;
    a multi-fibre optic cable extending into said housing, each of the optical fibres of said multi-fibre optic cable terminating at said first end of a respective one of said connectors; and
    a bonding agent within said housing to secure permanently said multi-fibre optic cable and said optical fibres within said housing and inhibit movement thereof.

9. A connector as defined in claim 8 wherein said housing is constituted by a pair of separable parts.

10. A connector as defined in claim 8 wherein said multi-fibre optic cable extends into said housing through a side thereof.

11. A connector as defined in claim 10 wherein each inclined face has one opening therein accommodating a connector.

12. A connector as defined in claim 1 wherein said boding agent is in the form of an adhesive.

13. A connector as defined in claim 12 wherein said housing is substantially completely filled with said adhesive.

14. A method of forming a multi-connection connector for a fibre optic cable comprising the steps of:
    adhering ferrules to the optic fibres of a multi-fibre optic cable;
    securing each of the ferrules to one end of a respective female connector;
    enclosing the optic fibres and the one ends of the female connectors in a housing constituted by separable parts, the other end of said female connectors extending exterior of said housing; and permanently securing the optic fibres within said housing to inhibit movement thereof.

15. The method of claim 14 wherein said optic fibres are permanently secured within said housing by a bonding agent injected into said housing.

16. The method of claim 15 wherein said bonding agent is in the form of an adhesive substantially completely filling said housing.

* * * * *